United States Patent [19]
Aoki

[11] Patent Number: 4,457,689
[45] Date of Patent: Jul. 3, 1984

[54] INJECTION STRETCHING BLOW MOLDING MACHINE

[76] Inventor: Katashi Aoki, 6037 Ohazaminamijo, Sakakimachi, Hanishina-gun, Nagano-ken, Japan

[21] Appl. No.: 343,394

[22] Filed: Jan. 28, 1982

[30] Foreign Application Priority Data

Feb. 3, 1981 [JP] Japan .................................. 56-14601

[51] Int. Cl.³ ............................................. B29C 17/07
[52] U.S. Cl. .................................... 425/525; 264/538; 425/526; 425/533; 425/534
[58] Field of Search ............... 425/525, 526, 533, 534; 264/538

[56] References Cited

U.S. PATENT DOCUMENTS

| | | | |
|---|---|---|---|
| 2,331,687 | 10/1943 | Hobson | 425/525 X |
| 3,198,617 | 8/1965 | Denman et al. | 425/525 X |
| 3,943,219 | 3/1976 | Aoki | 425/533 X |
| 3,944,643 | 3/1976 | Sato et al. | 425/526 X |
| 4,105,391 | 8/1978 | Aoki | 425/526 |

Primary Examiner—Jan H. Silbaugh
Attorney, Agent, or Firm—Ostrolenk, Faber, Gerb & Soffen

[57] ABSTRACT

A molding machine disclosed herein comprises a rotary disk having a required number of neck molds attached to the under-surface thereof, said rotary disk being located under the base plate, rotary disk capable of being intermittently rotated to thereby successively transport the neck molds to an injection molding stage, a temperature control state and a molded article releasing stage for continuous operation from the injection molding of parisons to the releasing of hollow molded articles. The present invention is characterized in that blow molds and mold opening and closing mechanisms therefor disposed movably up and down in the stretching and blow molding stage are moved up at the stretching and blow molding whereas moved down at the transporting the parisons and hollow molded articles.

7 Claims, 6 Drawing Figures

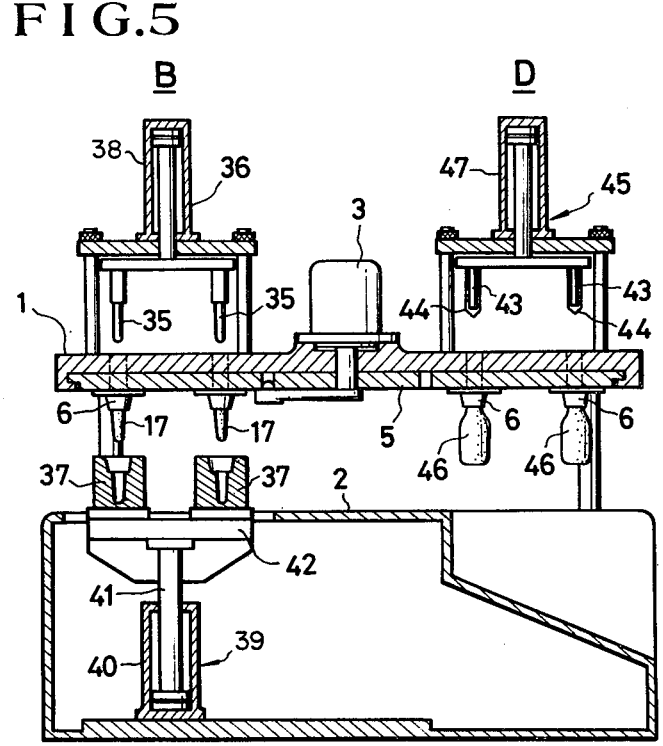

INJECTION STRETCHING BLOW MOLDING MACHINE

BACKGROUND OF THE INVENTION

In an injection stretching blow molding machine disclosed, for example, in the present inventor's U.S. Pat. No. 4,105,391, wherein a rotary disk is provided on the under-side of a base plate, the required number of neck molds are attached to the under-surface of and parallel to a tangent line of the rotary disk, and an injection molding mold, a temperature control member and a blow mold are disposed between the rotary disk and a machine bed, whereby when the rotary disk is stopped, the steps of injection molding parisons, temperature controlling, stretching blow molding hollow molded products and releasing are carried out. The blow mold and a mold closing mechanism are located between the rotary disk and a lower base plate which forms a part of the machine bed. This blow mold is opened and closed in a diametrical direction of the rotary disk by a mold opening and closing mechanism secured to the lower base plate, and in the state where the mold is open, laterally receives the neck mold parallel to the tangent line. When the rotary disk is stopped, the mold is closed by the mold opening and closing mechanism from both sides of the neck mold.

However, where a plurality of neck molds are provided, they are arranged in a linear fashion, and the neck molds and parisons held thereon are transported in the form of circular motion, and thus, the distance that the blow molds must be moved into their open positions becomes great in order to prevent them from contacting the blow molds. Further, the opening and closing mechanism for the blow molds is merely secured to the lower base plate, which mechanism is a mechanism uncapable of installing a tie bar to receive a mold closing reaction, that is, a reaction relative to the mold closing being a cantilever mechanism, and therefore, the mold closing force in an upper portion close to the neck mold is inevitably weak and in blow molding, the upper portion of the blow mold tends to open more than the lower portion thereof, which poses a disadvantage in that a parting line of the upper portion of a molded product becomes somewhat thick.

BRIEF SUMMARY OF THE INVENTION

It is, therefore, the primary object of the present invention to eliminate the above-discribed disadvantages caused to occur in the injection molding machine which was previously invented by the present inventor.

Another object of the present invention is to provide a new and improved injection stretching blow molding machine in which a rotary disk may be operated without any inconvenience even if neck molds, blow molds and the like are disposed in the form of a two-row.

A further object of the present invention is to provide an extremely economical injection stretching blow molding machine which can produce materially numerous synthetic resin bottles or hollow molded articles as compared with the above-mentioned prior art molding machine only by increasing the diameter of the rotary disc to a certain extent.

That is, the opening distance of the blow mold is set to a distance slightly greater than the diameter of a molded article, the mold opening and closing mechanism is provided with a support rod for supporting upper and lower portions of the mold, the blow mold so designed as to apply a balanced mold closing force to upper and lower portions and the opening and closing mechanism thereof are moved down to a position so that they may not contact with the neck molds, parisons held thereon and molded articles when the latter are transported, the blow molds are elevated until they may register with the neck molds when the neck molds and the like are completed to be transported and the parisons are stopped at the blowing position, the parisons are subjected to stretching and blowing, after which the molds are open to a degree slightly greater than the diameter of the molded article, and the blow molds and the opening and closing mechanism thereof are moved down to a position not to interfere with the transportion of the molded articles.

With such a mechanism as described above, a small mold opening distance will suffice, and a spacing between two rows of the mold opening and closing mechanisms arranged in two rows can be designed small and as a result, it becomes possible to install two rows of neck molds on a rotary disk having a reltively small diameter. Further, the injection molds, the temperature control member, the blow molds and the molded article releasing member may be installed in positions corresponding to the neck molds, and two rows of hot runners disposed under the injection molds may be connected by means of a connecting member. Thus, if molds for obtaining 10 articles are arranged in one row, twenty articles may be obtained in two rows, that is, this results from an arrangement to make it possible to design a volume manufacturing machine which can obtain twenty molded articles in one cycle.

In accordance with the aspects of the present invention, the injection blow molding machine comprises: a machine bed having four operation portions of an injection molding portion, a temperature control portion, a stretching and blowing portion and a releasing portion; a base plate which is attached with its peripheral portions in parallel to and above the machine bed; a rotary disk which is rotatably attached to the under-surface of the base plate and being provided with neck molds; a drive means secured to the middle portion of the base plate to rotate the rotary disk intermittently to the respective operation portions; a mold opening and closing mechanism, a temperature control mechanism, a stretching and blowing mechanism and a molded product releasing mechanism which are secured on the base plate and positioned respectively in the above injection molding, temperature control, stretching and blow molding, and molded product releasing portions; an injection mold disposed on the lower-side of the rotary disk movably up and down; a temperature control member; blow molds and injection mold opening and closing mechanism.

The aforementioned blow molds and the opening and closing mechanism are composed of a bed plate disposed movably up and down within the machine bed, a blow mold device mounted internally of a pair of mold opening and closing mechanisms and positioned on the bed plate leaving a predetermined space and provided with two sets of blow molds, which are movable in a horizontal direction on the base plate, corresponding to neck molds, and a stretching and blowing device positioned on said base plate.

Further, the aforementioned operation mechanisms are actuated by means of their respective drive mechanisms when the rotary disk is stopped at the predetermined position. The injection mold opening and closing mechanism is provided with parison cores, which are inserted into the cavities of the elevated injection molds. The temperature control mechanism is provided with temperature control cores, which are inserted into the temperature control member. The stretching and blowing mechanism is provided with stretching and blowing cores, which are inserted into the elevated blow molds.

Furthermore, the aforementioned blow molds and the mold opening and closing mechanism thereof move up to a predetermined height when the rotary disk is in its stopped state and parisons are being molded in the injection molding stage, and then the molds are closed and the stretching and blowing cores are inserted.

Elevating means used for the above-described respective cores, the blow molds and the mold opening and closing mechanism may include air or hudraulic mechanism, and drive means for the rotary disk may include an electric motor and reduction gear or a torque actuator, a hydraulic motor or the like.

BRIEF DESCRIPTION OF THE DRAWINGS

The injection stretching and blow molding machine in accordance with the present invention is without showing the detailed portions illustrated in the accompanying drawings, in which:

FIG. 5 is a longitudinal sectional view of a temperature control portion and a releasing portion of molded articles when the molds are open.

FIG. 6 is a plan view of a means of the molds for blow molding.

DESCRIPTION OF THE PREFERRED EMBODIMENT

Figure 1:
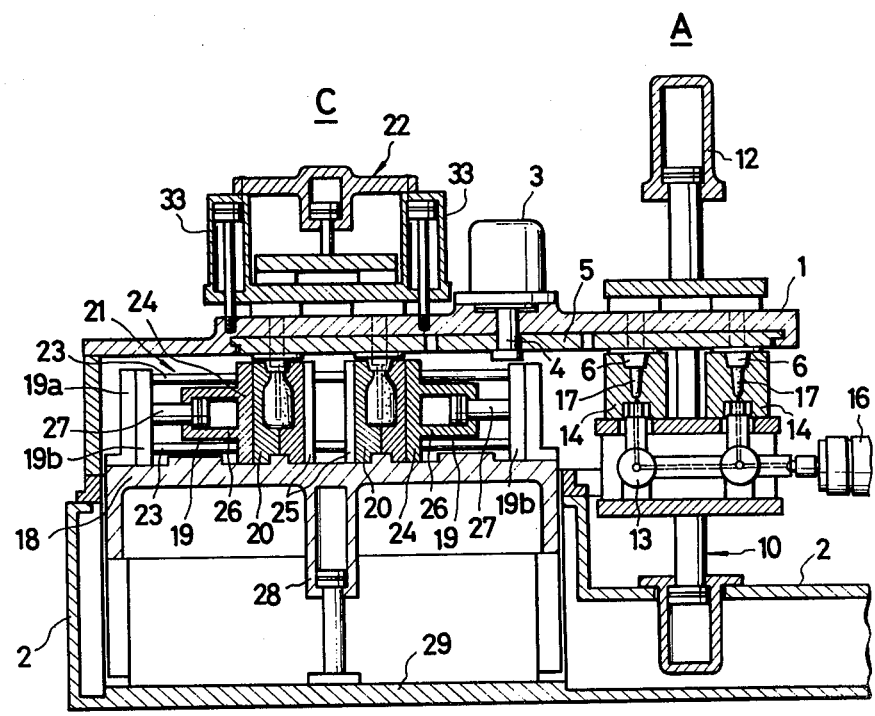
FIG. 1 is a longitudinal sectional view of an injection molding portion and a stretching and blow molding portion when the molds are closed.

The specific embodiment of the present invention will now be described in detail in conjunction with the accompanying drawings.

A base plate 1 is horizontally disposed above a machine bed 2 leaving a predetermined space. A rotary disk 5 is fitted to the under-surface of the base plate 1, and is turned through 90 degree increments via a rotary shaft 4 by means of an actuator 3 positioned in the middle portion of the base plate.

To four sides of the under-surface of the rotary disk 5 are fitted a plurality of neck molds 6, which mold neck portions of hollow molded products such as bottles, parallel to a tangent line of the rotary disk 5.

Figure 2:
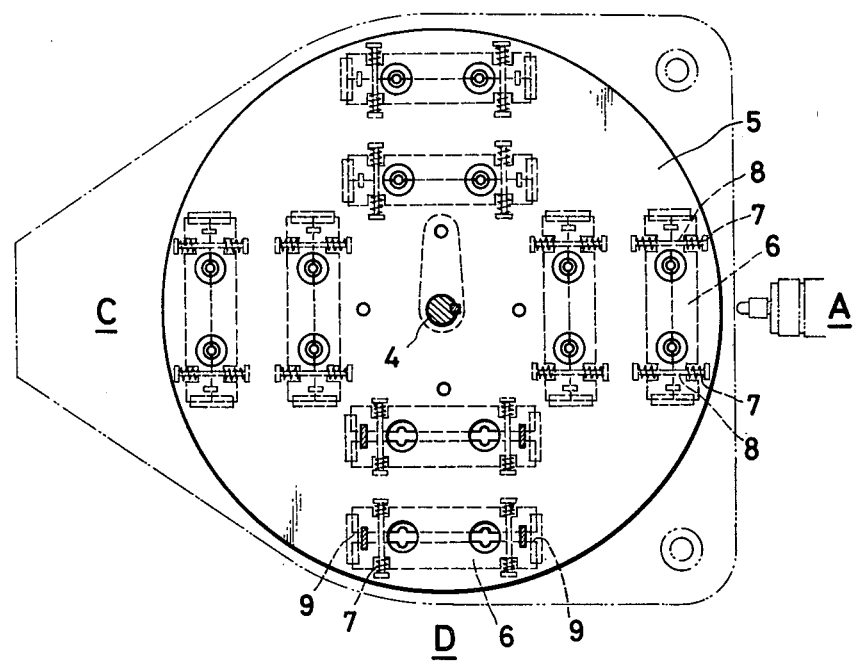
FIG. 2 is a plan view of a rotary disk and a base plate is shown by a chain line.
Figure 3:
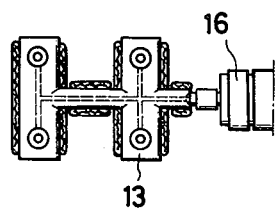
FIG. 3 is a plan view of a hot runner block.

As shown in FIG. 2, each neck mold 6 comprises an element in which a pair of rectangular die plates of a sectional die are joined by means of a spring 7 and a guide pin 8, and the mold is opened in a radial direction of the rotary disk 5 by a wedge 9 inserted into a seam of the sectional die. While two sets of neck molds 6, 6 are arranged in four sides in the illustrated embodiment, it should be noted that the neck molds 6 can be arranged in one row.

On the four sides of the rotary disk 5, there are formed an injection molding stage A, a temperature control stage B, a stretching and blow molding stage C and a molded product releasing stage D, and the rotary disk 5 is stopped at a position where each pair of neck molds 6, 6 faces a respective stage, so that during the stoppage of the rotary disk, the respective steps of molding, temperature controlling, and releasing are carried out.

The injection molding stage A is composed of a mold closing mechanism 10 provided on the machine bed 2, and a core mold closing mechanism 12 connected to the mold closing mechanism 10 by means of a tie bar 11 (FIG. 4) and positioned on the base plate 1. The mold closing mechanism 10 has a hot runner block 13 and two sets of injection molds 14 corresponding to the neck molds 6, 6 mounted thereon.

The core mold closing mechanism 12 has a core 15 mounted downwardly thereon which extends through the base plate 1, the rotary disk 5 and the neck molds 6, 6 and accommodated in the center of the closed injection mold 14. The molten resin from the injection device 16 passes through the hot runner block 13 and is poured into the cavity formed by the core 15 (FIG. 4) to form a bottomed parison 17 in the periphery of the core.

Next, the stretching and blow molding stage C is composed of a bed plate 18 provided movably up and down within the machine bed 2, a blow mold device 21 mounted internally of a pair of mold opening and closing mechanisms 19, 19 disposed on the bed plate leaving a predetermined space and provided with two sets of blow molds 20, 20 horizontally movable above the bed plate 18 corresponding to the neck molds 6, 6, and a stretching and blowing device 22 disposed on the base plate 1.

The mold opening and closing mechanisms 19, 19 are composed of a pair of fixed plates 19a, 19a opposedly provided on the bed plate 18, a plurality of guide bars 23, 23 horizontally provided over the fixed plates, two sets of mold mounting plates 24, 25 and a movable plate 19b movably supported on the guide bars, a hydraulic cylinder 26 directly connected to the external mold mounting plate 24, a piston 27 connected to the movable plate 19b, and a tension rod 19c provided over the internal mold mounting plate 25 and the movable plate 19b (see FIG. 6). The aforementioned blow mold device 21 has two sets of blow molds 20, 20 provided within the machine bed 2 so as to be opened and closed in a radial direction of the rotary disk 5, and opening and closing and mold clamping are carried out by a pair of hydraulic cylinders 26, 26 and pistons 27, 27. Reference numeral 28 designates an elevating device for the blow mold device 21 by hydraulic pressure disposed over the bed plate 18 and a bottom plate 29 of the machine bed.

Figure 4:
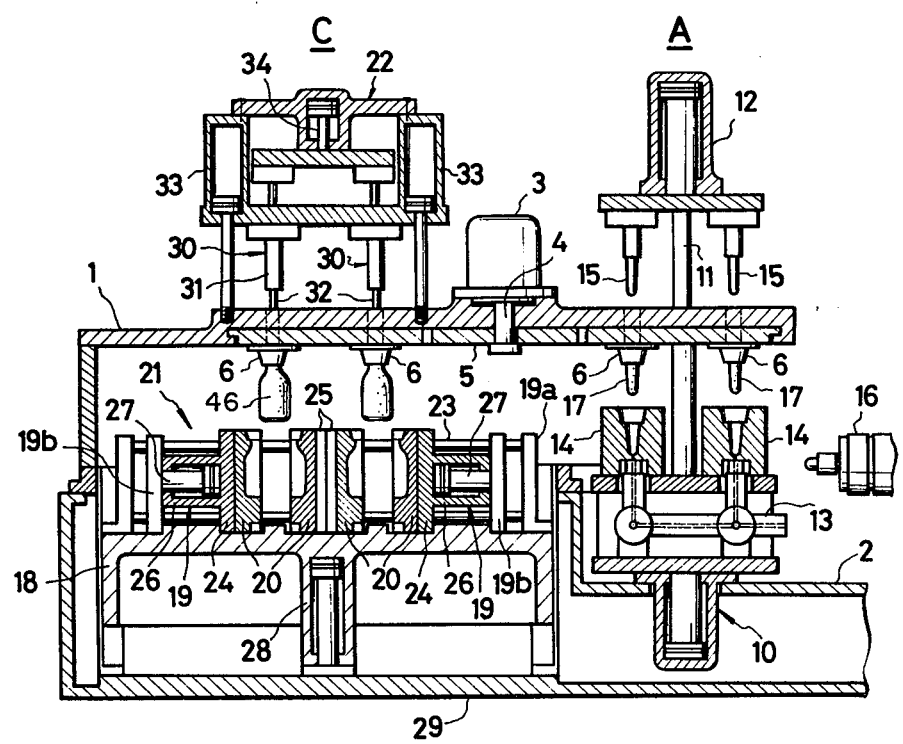
FIG. 4 is a longitudinal sectional view of an injection molding portion and a stretching and blow molding portion when the molds are open.

The blow core elevating device 22 has blow cores 30, 30 mounted downwardly thereon which extends through the base plate, the rotary disk 5 and the neck molds 6, 6 and is inserted into the parison 17, the stretching and blow cores 30, 30 being provided with a stretching core 32 within a blow tube 31, as shown in FIG. 4, so that upon actuation of the air cylinder 33, the entire blow core moves down, and subsequently, upon actuation of the air cylinder 34, only the stretching core 32 further moves down to axially extend the parison 17 held by the neck molds 6, 6 in the center of the closed blow molds 20, 20 and is blown into the parison to fully expand the cavity.

A molded product releasing stage D, as shown in FIG. 5 is provided at a position opposed to the temperature control stage B provided between the injection molding stage A and the stretching and blow molding stage C. The base plate 1 of the temperature control stage B has a temperature control mechanism mounted thereon which inserts temperature control cores 35, 35 into a temperature control member 37 located on underside of the rotary disk 5 extending through the base plate 1, the rotary disk 5 and the neck mold 6 by an air cylinder 36.

The temperature control member 37 is connected to an elevating device 38 mounted longitudinally on the side of the machine bed. This elevating device 38 is composed of an air or hydraulic cylinder 40 and a piston 41, and a plurality of temperature control members 37, 37 are mounted on seat plate 42 at an extreme end of a rod of the piston 41.

The base plate 1 of the molded product releasing stage D has a releasing mechanism 45 mounted thereon which inserts a guide core 43 and a member 44 for dividing and opening the neck mold in a radial direction of the rotary disk 5 extending through the base plate 1 and the rotary disk 5. The releasing mechanism 45 is actuated by an air or hydraulic cylinder 47, and a molded product 46 falls plumb down without being adhered to either side of the neck mold 6 opened by the guide core 43 extended through and inserted into the neck mold 6.

Next, the stretching and blow molding stage C operates as follows: First, as shown in FIG. 1, when the neck molds 6, 6 are at the stop positions and the parison 17 is being molded at the injection molding stage A, the blow molds 20, 20 move up together with the mold opening and closing mechanisms 19, 19 disposed on the bed plate 18 by the cylinder 28 until they register with the neck molds 6, 6. Next, the mold opening and closing mechanisms 19, 19 are actuated to close the molds and the stretching and blow cores 30, 30 move down as previously mentioned to stretch and blow mold the parison 17 into a hollow molded article 46.

Upon completion of said molding, the blow molds 20, 20 are opened and the hollow molded article 35 is held on the neck molds 6, 6. Then, the elevating device 28 is actuated, the blow mold device 21 is moved down together with the bed plate 18 into the machine bed 2 as shown in FIG. 4, and the stretching and blow cores 30, 30 move up onto the base plate. At the same time, the injection molds 14, 14 are opened and the bottomed parison 17 is released while being held on the neck molds 6, 6. Since such upward and downward operation is carried out even in the temperature control portion and molded article releasing portion, there is present no member to impair rotation of the rotary disk 3 in a transporting direction of the neck molds 6, 6, the parison 17 and the hollow molded article 45, and the rotary disk 5 causes the neck molds 6, 6 to be transported towards the subsequent step.

As described above, in the present invention, the blow mold device 21 is made movably up and down so that when the rotary disk 5 is rotated, the blow molds 20, 20 cause the blow mold device 21 to move down while being open to permit the parison 17 and hollow molded article 35 along with the neck molds 6, 6 to move towards and away from the stretching and blow molding stage without being placed in contact each other. In addition, the opening distance of the blow molds 20, 20 will suffice to be a degree such that they may not touch the outer wall of the hollow molded article 35, and therefore the distance may be materially shortened as compared with the aforementioned prior arts. Accordingly, the spacing of the central divided line of two rows of the neck mold die plates disposed on the rotary disk is represented by (Thickness of one side of blow mold 9×2)+(Movable plate 24×2)+(Radius of hollow molded article 22×2), which is approximately 260 mm in case of a hollow molded article having a diameter 80 mm. Where 10 molds in one row or hollow molded articles of said size are provided, the rotary disk may be fabricated to have a diameter of approx. 2600 mm.

If molds with 20 hollow molded articles of the same size arranged in one row should be disposed on the rotary disk in a manner similar to the aforementioned prior arts, the diameter of the rotary disk would be approximately 3300 mm, and the resultant members increase in size thus making it difficult to provide land transportation from makers to users and difficult to manufacture the molds. In this respect, the present invention is advantageous to manufacture them in size not considerably greater than those of prior art.

What is claimed is:

1. An injection, stretching and blow molding machine for parisons, comprising:

a horizontal machine bed; a base plate supported spaced above and parallel to the machine bed; a rotary disk supported by the base plate; a plurality of pairs of neck molds, each pair of neck molds being located along a respective radius of said disk with one neck mold of the pair being located radially inward of and spaced from the remaining neck mold of the pair, each radius being spaced apart from the adjacent radii by a predetermined angle, each neck mold being supported by the disk and adapted to hold at least one parison such that said parisons extend beneath the neck mold and beneath the disk; drive means connected with the disk for rotating the disk, at spaced intervals, with respect to the base plate, said drive means rotating the disk by angles corresponding to said predetermined angle;

at spaced locations on the machine, there being defined, in the following sequence, around the disk, and located stationary with respect to the rotating disk, the following stages, each stage being so located that it is adjacent a respective pair of neck molds when the disk is stopped by the drive means:

(a) an injection molding stage comprising: a pair of injection molds aligned axially of the disk; a mold closing mechanism at the machine bed; the injection molds being all supported on the closing mechanism, first moving means for moving the mold closing mechanisi for moving the injection molds up to move the neck molds into the injection molds and for moving the injection molds down, away from the neck molds;

(b) a temperature control stage, comprising: a pair of temperature control members, each for cooperating with at least one parison which has been formed in a respective one of the injection molds; a second moving means for raising the temperature control members up toward the disk and the parisons located at the temperature control stage and for moving the temperature control members down away from the disk and the parisons located at the temperatyre control stage;

(c) a stretching and blow molding stage, comprising: a blow mold device, including a pair of blow molds for respective groups of parisons located at the stretching and blow molding stage, said blow molds forming said parisons into respective molded objects; third moving means for moving the blow mold device in the axial direction of the disk up toward the disk and the parisons located at the blow molding stage and down away from the disk not to a position not to interfere with transportation of said molded objects; the blow mold device including a mold opening and closing mechanism for opening and closing the blow molds along the radial direction of the disk a distance which is slightly greater than the diameter of said molded objects when the blow mold device has been moved up by the third moving means; and (d) a molded product release stage, including release means for contacting the respective neck molds at the release stage for opening the neck molds for releasing said molded objects held by the neck molds; fourth moving means for moving the release means from a position up and above the disk and neck molds to a position down and toward the disk for causing the release means for opening the neck molds;

at least the third moving means being separate from the first and second moving means for moving independently with respect to one another.

2. The machine of claim 1, wherein the drive means is coordinated with the first, second, third and fourth moving means so that the drive means operates the disk when the first, second, third and fourth means have respectively moved the injection molds of injection molding stage, the temperature control members of the temperature control stage, the blow molds of the blow molding stage and the release means of the release stage away from the disk, so that they will not interfere with rotation of the disk and of parisons supported on the neck molds at the disk.

3. The machine of claim 1, wherein the disk has an undersurface and the neck molds are supported at the undersurface of the disk.

4. The machine of claim 1, wherein the base plate has an undersurface and the rotary disk is adjacent to the undersurface of the base plate.

5. The machine of claim 1, wherein the drive means for the disk are positioned at the middle portion of the base plate.

6. The machine of claim 1, wherein the blow mold device of the stretching and blow molding stage includes a bed plate which is connected with the third moving means for being moved up and down thereby; the mold opening and closing mechanism of the blow mold device comprises two pairs of elements on the bed plate, each element of a respective pair being movable in opposition to and with respect to the other of the pair in a radial direction of the disk, a respective divisible blow mold being disposed between the two elements of each pair, said elements being movable radially by respective means; the third moving means being adapted for moving the bed plate upwardly to a position where the blow molds register with the respective neck molds at the disk and for moving the bed plate downwardly.

7. The machine of claim 1, wherein all of the neck molds hold first and second parisons and are so oriented that a line extending between the parisons lies parallel to a respective tangent line to the disk.

* * * * *